(12) United States Patent
Yang

(10) Patent No.: US 11,080,551 B2
(45) Date of Patent: Aug. 3, 2021

(54) PROPOSAL REGION FILTER FOR DIGITAL IMAGE PROCESSING

(71) Applicant: INTEL CORPORATION, Santa Clara, CA (US)

(72) Inventor: Liu Yang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 54 days.

(21) Appl. No.: 16/607,212

(22) PCT Filed: May 22, 2017

(86) PCT No.: PCT/CN2017/085293
§ 371 (c)(1),
(2) Date: Oct. 22, 2019

(87) PCT Pub. No.: WO2018/213972
PCT Pub. Date: Nov. 29, 2018

(65) Prior Publication Data
US 2020/0380288 A1 Dec. 3, 2020

(51) Int. Cl.
*G06K 9/46* (2006.01)
*G06T 7/73* (2017.01)
(Continued)

(52) U.S. Cl.
CPC ......... *G06K 9/4671* (2013.01); *G06K 9/3233* (2013.01); *G06K 9/6267* (2013.01); *G06T 7/73* (2017.01)

(58) Field of Classification Search
CPC ... G06T 7/11; G06T 7/162; G06T 7/73; G06T 2207/20164; G06K 9/3233; G06K 9/3241;
(Continued)

(56) References Cited

U.S. PATENT DOCUMENTS

| 2014/0286579 A1 | 9/2014 | Grujic et al. ........ G06K 9/0053 |
| 2015/0078654 A1* | 3/2015 | Chaudhury et al. ......... |
| | | G06K 9/00744 |
| | | 382/159 |

(Continued)

FOREIGN PATENT DOCUMENTS

| CN | 105793729 A | 7/2016 | ............. G01S 15/89 |
| CN | 106407974 A | 2/2017 | ............... G06K 9/32 |

OTHER PUBLICATIONS

Rahman et al., "'Bag of Keypoints'-Based Biomedical Image Search with Affine Covariant Region Detection and Correlation-Enhanced Similarity Matching", Proc. IEEE 23rd Symp. on Computer-Based Medical Systems, Oct. 2010, pp. 261-266 (complete document).*

(Continued)

*Primary Examiner* — Andrew W Johns
(74) *Attorney, Agent, or Firm* — Hanley, Flight & Zimmerman, LLC

(57) ABSTRACT

An embodiment of a computer-implemented method generates a filtered set of region proposals for a digital image processing network. The method comprises generating a keypoint count map for a digital image, wherein the keypoint count map indicates how many keypoints have been detected near different pixels in the digital image. The method also comprises generating a keypoint integral image, wherein the keypoint integral image comprises a summed area table that is based on the keypoint count map. The method also comprises generating object existence indicators for an initial region set for the digital image based on the keypoint integral image, and extracting a keypoint-filtered region set from the initial region set based on the object existence indicators. The method may also comprise using the keypoint-filtered region set as region proposal input for (Continued)

an object proposal subsystem. Other embodiments are described and claimed.

25 Claims, 5 Drawing Sheets

(51) Int. Cl.
*G06K 9/32* (2006.01)
*G06K 9/62* (2006.01)

(58) Field of Classification Search
CPC .. G06K 9/4604; G06K 9/4642; G06K 9/4647; G06K 9/4671; G06K 9/4676; G06K 9/6232; G06K 9/6261
See application file for complete search history.

(56) References Cited

U.S. PATENT DOCUMENTS

| | | | | |
|---|---|---|---|---|
| 2016/0143617 | A1 | 5/2016 | Ebbini et al. | A61B 8/14 |
| 2017/0032220 | A1 | 2/2017 | Medasani et al. | G06K 9/6218 |
| 2019/0030371 | A1* | 1/2019 | Han | G16H 50/20 |

OTHER PUBLICATIONS

PCT Search Report and Written Opinion prepared for PCT/CN2017/085293, completed Jan. 15, 2018.
Rahman, Mahmudur, et al., "Bag of Keypoints"-Based Biomedical Image Search with Affine Covariant Region Detection and Correlation-Enhanced Similarity Matching, 2010, Computer-Based Medical Systems (CBMS), IEEE 23rd International Symposium, abstract only.

* cited by examiner

PROPOSAL REGION FILTER FOR DIGITAL IMAGE PROCESSING

CROSS REFERENCE TO RELATED APPLICATIONS

The present application is a national stage entry under 35 USC § 371(b) of International Application No. PCT/CN2017/085293, filed May 22, 2017.

TECHNICAL FIELD

This disclosure pertains in general to technology for digital image processing. In particular, this disclosure pertains to methods and apparatus to perform region definition for digital image processing.

BACKGROUND

The field of digital image processing (hereinafter "image processing") involves using one or more computer algorithms to process digital images. A common objective for image processing is to automatically determine what objects are in an image. For purposes of this disclosure, the overall process of automatically determining what objects are in an image may be referred to in general as "object recognition." In general, object recognition is very difficult challenge.

Many different approaches have been used to perform object recognition over the years. Currently, one popular approach is to use multiple layers of algorithms to process an image, with each layer (other than the first or lowest layer) using results from a lower layer as input, and with each layer (other than the highest or last layer) generating output to be used by a higher layer. A collection of algorithms or programs that cooperate in this manner may be referred to as an "artificial neural network" (ANN). Additionally, this approach may be referred to as involving "hierarchical learning," "deep structured learning," "deep machine learning," "deep learning," or simply "machine learning." Thus, machine learning may involve many layers of algorithms that perform different tasks, with each successive layer using the output from the previous layer as input. For purposes of this disclosure, a collection of computer algorithms that cooperate as an ANN to perform digital image processing may be referred to as an "image processing network". And more specifically, an ANN that performs object recognition may be referred to as an "object detection network" (ODN).

For example, in an ODN, the process of object recognition may proceed through various different phases of operation, including different phases for the following three tasks: (a) determining which areas or regions of an image represent objects, (b) determining the types of those objects, and (c) determining the specific identities of those objects. For purposes of this disclosure, those three specific tasks or phases may be referred to respectively as (a) "region definition," (b) "object classification," and (c) "object identification." For example, one algorithm (or set of algorithms) may perform region definition, then another algorithm (or set of algorithms) may perform object classification, and then another algorithm (or set of algorithms) may perform object identification. For purposes of this disclosure, the term "object recognition" denotes a general objective, while the terms "region definition," "object classification," and "object identification" denote three specific processes to perform the three specific tasks identified above. In other words, an ODN may perform the specific tasks of region definition, object classification, and object identification as parts of a general process of object recognition. Also, for purposes of this disclosure, "object classification" denotes determine the general class of an object (e.g., determining whether an object is a human face), and "object identification" denotes determining the specific identity of an object (e.g., determining whether the object is the face of a particular person.).

One example of an ODN is described in a paper entitled "HyperNet: Towards Accurate Region Proposal Generation and Joint Object Detection," dated Apr. 4, 2016, by Tao Kong et al. (the "HyperNet paper").

Before ODNs were used for image processing, other approaches were used. For purposes of this disclosure, any of those older approaches may be referred to in general as a "legacy system." One tool that was used by a legacy system is referred to as "Features from Accelerated Segment Test" or "FAST." Over a decade ago, in 2006, FAST was described in a paper by Edward Rosten and Tom Drummond entitled "Machine learning for high-speed corner detection."

As described in greater detail below, the present disclosure involves technology pertaining to the region definition portion of an ODN.

DESCRIPTION OF EMBODIMENTS

The HyperNet paper refers to an ODN known as "HyperNet." HyperNet includes two subnetworks which are referred to as a "proposal network" and a "detection network." The proposal network of HyperNet works to select a small number (e.g., 100) of object-likely regions from tens of thousands (e.g., 30,000) initial region proposals (or "bounding boxes"). In particular, the proposal network applies a set of complicated operations to each of the tens of thousands of initial region proposals to select out 100 region proposals to be further processed by the detection network. Thus, the HyperNet detection network may process only 100 region proposals per image, after the HyperNet proposal network has processed 30,000 region proposals.

The present disclosure describes technology for efficiently generating effective sets of region proposals. In particular, as described in greater detail below, the present disclosure describes the generation of a data structure referred to as a "keypoint integral image" and the utilization of a keypoint integral image to generate a set of region proposals. For purposes of this disclosure, the term "keypoint-filtered region set" refers to a set of region proposals that is generated based on a keypoint integral image. Such a keypoint-filtered (KF) region set may be used by Hyper-Net, or by any other suitable ODN, to recognize objects. For instance, an ODN may use a KF region set to perform object classification and object identification.

Figure 1:
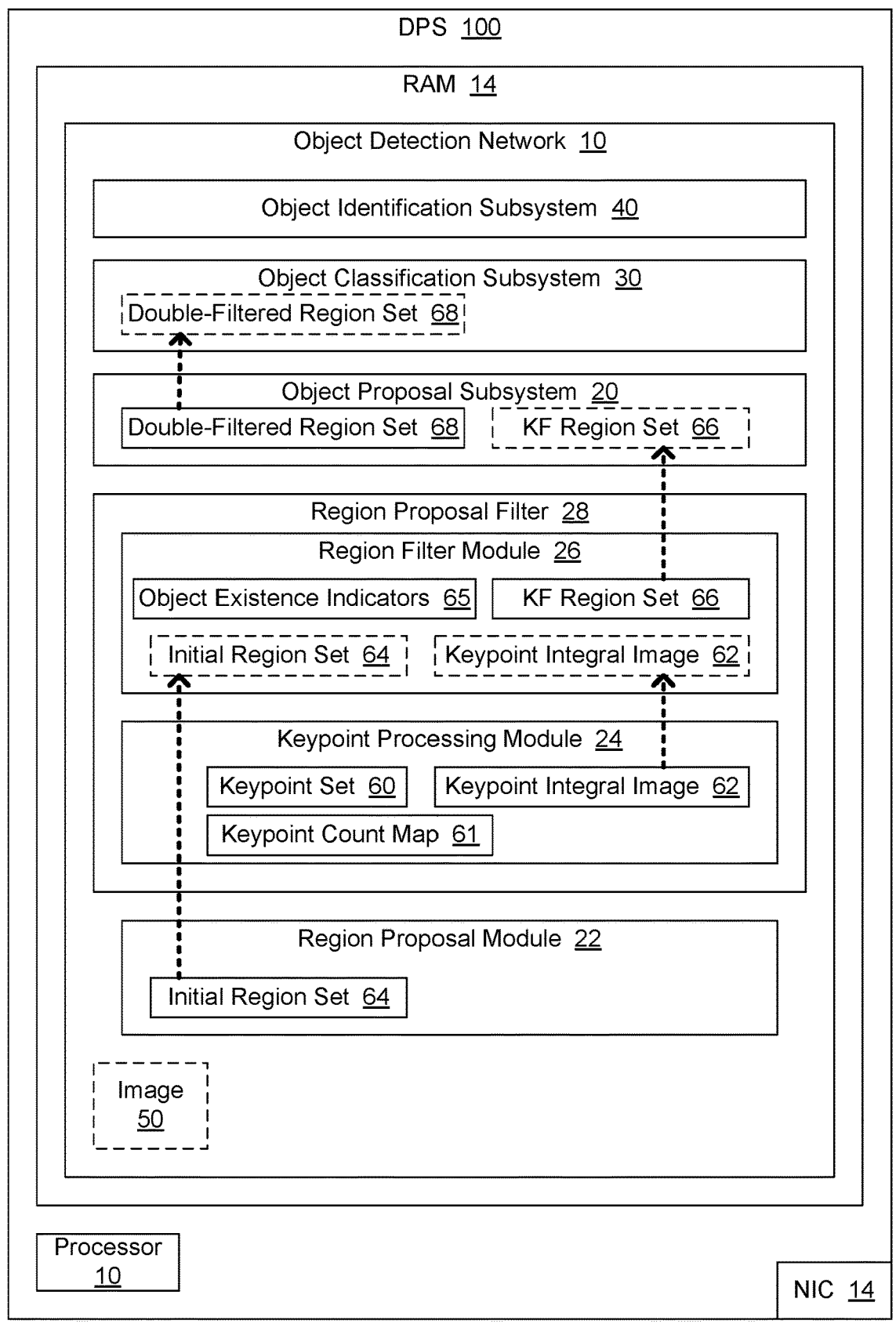
FIG. 1 is a block diagram of an example embodiment of a data processing system with technology for generating a keypoint integral image and using the keypoint integral image for object detection.

FIG. 1 is a block diagram of an example embodiment of a data processing system (DPS) 100 with technology for generating a keypoint integral image 62 and using keypoint integral image 62 for object detection. As illustrated, in the example embodiment, DPS 100 includes at least one processor 10 which uses random access memory (RAM) 14 to execute a object detection network (ODN) 10. ODN 10 includes an object proposal subsystem 20, an object classification subsystem 30, an object identification subsystem 40, a region proposal module 22, and a region proposal filter 28. As indicated below, ODN 10 may perform object recognition on an image 50.

Region proposal filter 28 includes a keypoint processing module 24 and a region filter module 26. As described in greater detail below, region proposal module 22 generates an initial region set 64 for image 50. Keypoint processing module 24 generates a keypoint set 60 for image 50 and then generates a keypoint integral image 62, based on the keypoint set 60. Region filter module 26 takes initial region set 64 and keypoint integral image 62 and generates a set of object existence indicators 65 and a KF region set 66.

Object proposal subsystem 20 then performs additional operations to filter additional regions out of KF region set 66, thereby generating a double-filtered region set 68. Object classification subsystem 30 then determines which regions in double-filtered region set 68 actually include objects, etc.

In FIG. 1, dashed boxes are used to denote items that are obtained from another module. For instance, keypoint integral image 62 is illustrated with a dashed box in region filter module 26 because region filter module 26 obtains keypoint integral image 62 from keypoint processing module 24.

Figure 2:
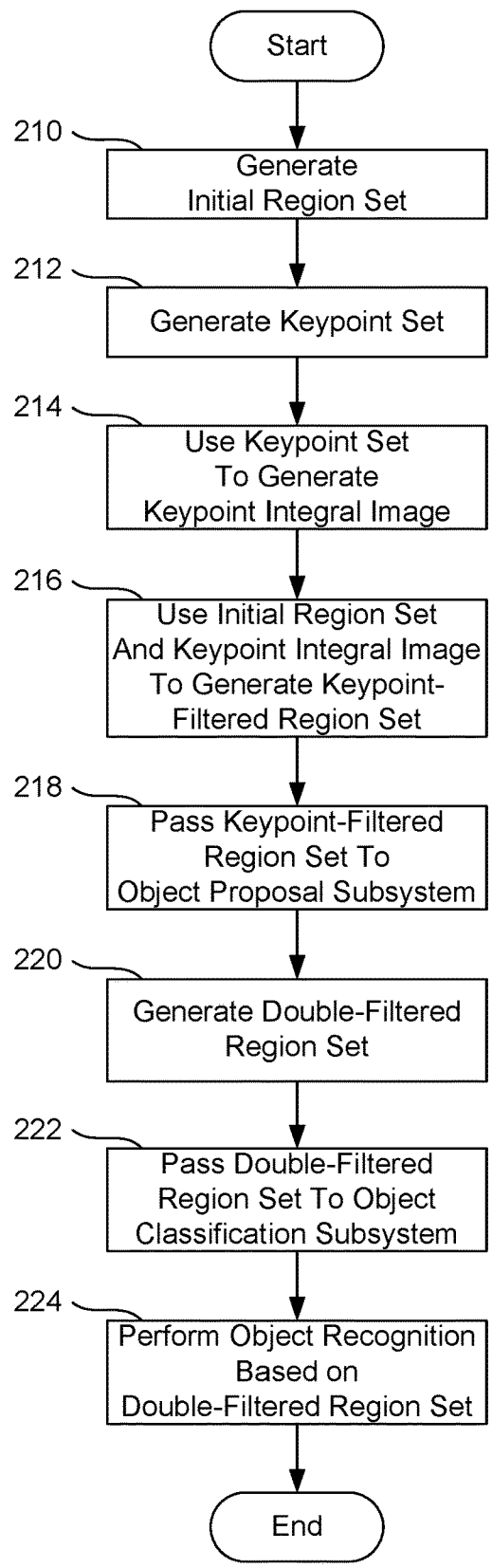
FIG. 2 presents a flowchart of an example embodiment of a process for generating a keypoint integral image and using the keypoint integral image for object detection.

FIG. 2 presents a flowchart of an example embodiment of a process for generating keypoint integral image 62 and using keypoint integral image 62 for object detection. That process may start at block 210 with region proposal module 22 generating initial region set 64. Once it has been generated, initial region set 64 is a set of regions, with each region specifying a portion of image 50 that is suspected to contain an object. Such a region may also be referred to as a "region proposal" or simply a "proposal." A region may be defined as the area included in a rectangle with an upper left corner at location $(i_1,j_1)$ and a lower right corner at location $(i_2,j_2)$. Such a region may be referred to as a "bounding box."

Any suitable approach may be used to generate initial region set 64. For instance, region proposal module 22 may use an approach like the one used by HyperNet. Consequently, region proposal module 22 may generate tens of thousands of initial regions for image 50.

Also, as shown at block 212, keypoint processing module 24 may generate keypoint set 60 for image 50. Keypoint set 60 identifies each of the locations within image 50 that keypoint processing module 24 has determined to be a keypoint. Thus, keypoint set 60 is a set of keypoints. Some authors use terms like "corner" and "interest point" in general to refer to keypoints, even though such a "corner" might actually be an edge or some other type of interest point. For purposes of this disclosure, the term "keypoint" is used in general to refer to a location that has been determined to be a corner, an edge, or any other type of interest point.

In one embodiment, to generate keypoint set 60, keypoint processing module 24 uses an approach that is the same as or similar to the approach described above as "Features from Accelerated Segment Test" or "FAST." In particular, keypoint processing module 24 evaluates image 50 to determine which locations in image 50, if any, should be classified as keypoints. More specifically, keypoint processing module 24 evaluates some or all of the pixels as potential keypoints, and for each potential keypoint, keypoint processing module 24 determines whether that potential keypoint is to be classified as an actual keypoint, based on the attributes of a predetermined number of pixels surrounding the potential keypoint. In one embodiment, keypoint processing module 24 considers the attributes of sixteen pixels surrounding the potential keypoint. Other embodiments may consider a lesser or greater number of surrounding pixels. In one embodiment, keypoint processing module 24 uses an approach like FAST that has a good response on image attributes or textures such as edges, corners, etc. In other words, keypoint processing module 24 is good at determining whether a potential keypoint is an edge, a corner, etc.

In one embodiment, keypoint processing module 24 uses a pair of coordinates to encode or represent each keypoint in keypoint set 60. For instance, each keypoint K may take the following form:

$$(x_k, y_k)$$

where $x_k$ and $y_k$ are the floating-point coordinates of keypoint K.

Accordingly, keypoint set 60 may constitute the set KS according to the following formula:

$$KS=\{(x_k,y_k)|1 \leq k \leq N\}$$

where N is the number of keypoints detected in image 50.

As shown at block 214, after generating keypoint set 60, keypoint processing module 24 may use keypoint set 60 to generate keypoint integral image 62. For instance, keypoint processing module 24 may use a process like the one illustrated in FIGS. 3 and 4 to generate keypoint integral image 62.

Figure 3:
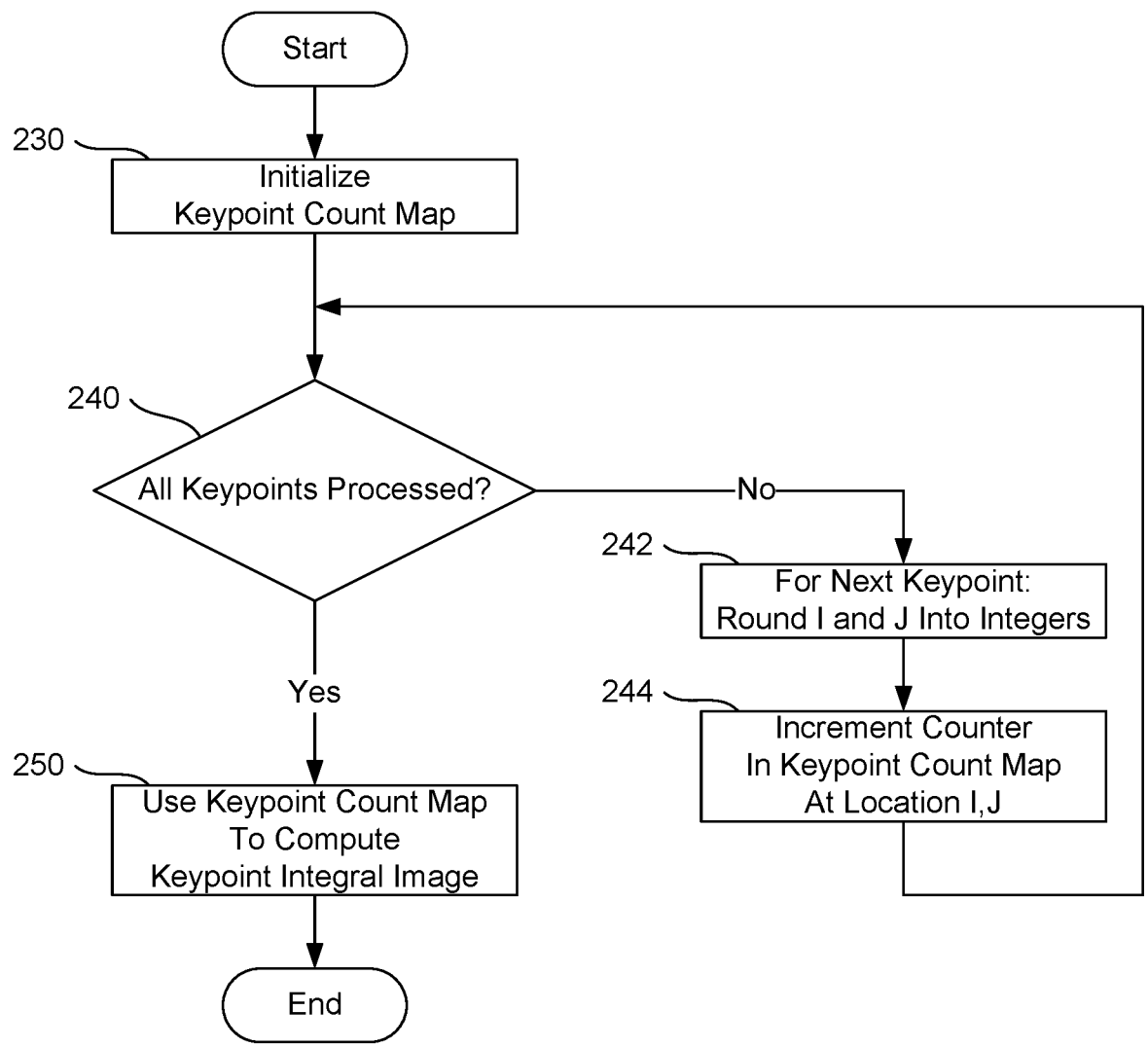
FIG. 3 presents a flowchart of an example embodiment of a process for using a keypoint set and a keypoint count map to generate a keypoint integral image.

FIG. 3 presents a flowchart of an example embodiment of a process for using keypoint set 60 and a keypoint count map to generate keypoint integral image 62. That process may start with keypoint processing module 24 initializing a keypoint count map 61, as shown at block 230. In one embodiment, keypoint count map 61 is a table of cells, with each cell corresponding to a pixel in image 50, and with each cell containing an integer counter value that is initialized to zero. As shown at block 240, keypoint processing module 24 may then determine whether all of the keypoints in keypoint set 60 have been processed yet. Keypoint processing module 24 may then loop through blocks 240, 242, and 244 until all of the keypoints have been processed.

In particular, as shown at block 242, keypoint processing module 24 may select the next keypoint to process (which, at the beginning of the process could be the first keypoint), and keypoint processing module 24 may round the coordinates in that keypoint into integers. Consequently, those integers will identify the pixel in image 50 that matches or is closest to the selected keypoint. In other words, each cell in keypoint count map 61 represents or identifies a respective pixel in image 50. As shown at block 244, keypoint processing module 24 may then increment the counter for that pixel in keypoint count map 61. And then the process may return to block 240, to be repeated until all of the keypoints in keypoint set 60 have been processed.

For purposes of this disclosure, a keypoint with coordinates that round to a particular cell in keypoint count map 61 may be said to "belong" to that cell. Consequently, when keypoint processing module 24 has finished generating keypoint count map 61, keypoint count map 61 will indicate, for each pixel, how many keypoints belong to that pixel.

As shown at block 250, keypoint processing module 24 may then use keypoint count map 61 to generate keypoint integral image 62. For instance, keypoint processing module 24 may use a process like the one illustrated in FIG. 4 to generate keypoint integral image 62.

Figure 4:
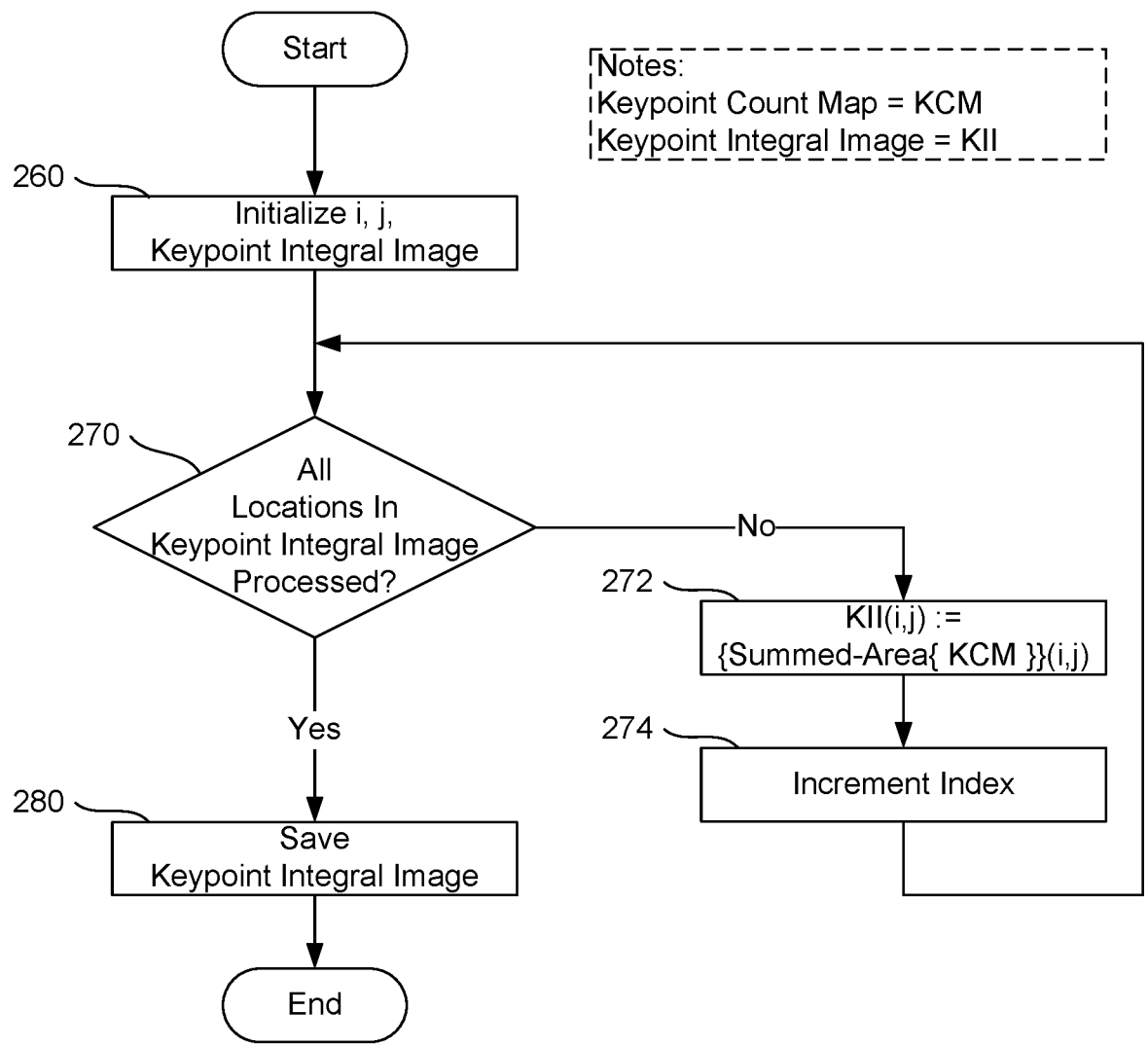
FIG. 4 presents a flowchart of an example embodiment of a process for using a keypoint count map to generate a keypoint integral image.

FIG. 4 presents a flowchart of an example embodiment of a process for using keypoint count map 61 to generate keypoint integral image 62. As described in greater detail below, keypoint processing module 24 creates keypoint integral image 62 as a summed area table, based on keypoint count map 61.

Keypoint processing module 24 may start by initializing the indexes i and j, as well as keypoint integral image 62. In one embodiment, keypoint integral image 62 is a table of cells, with each cell corresponding to a pixel in image 50. In other words, image 50, keypoint count map 61, and keypoint integral image 62 may all have the same shape and dimensions. As shown at block 270, keypoint processing module 24 may then determine whether all locations in keypoint integral image 62 have been processed. Keypoint processing module 24 may then loop through blocks 270, 272, and 274 until each cell in keypoint integral image 62 has received a summed area value. Keypoint integral image 62 may therefore be considered a summed area table.

In particular, keypoint processing module 24 may generate a summed area value for each cell in keypoint count map 61 according to the following formula:

$$KII(i,j):=KCM(i,j)+KII(i-1,j)+KII(i,j-1)+KII(i-1,j-1)$$

where:
KCM is keypoint count map 61,
KCM(i,j) is a cell in keypoint count map 61,
KII is keypoint integral image 62, and
KII(i,i) is a cell in keypoint integral image 62; and
where the value zero is used for any cells with invalid indexes (e.g., an index value of less than 1).

In other words, keypoint processing module 24 computes the summed area value for the cell at KII(i,j) by adding the counter value in KCM(i,j) to the summed area values that have already been computed for the cells immediately above and/or to the left of KII(i,j). An alternative formula to describe a summed area table is as follows:

$$I_\Sigma(x,y)=i(x',y')$$
$$x'\leq x$$
$$y'\leq y$$

Thus, the value at any cell (x,y) in keypoint integral image 62 is the value at cell (x,y) in keypoint count map 61 plus the sum of all values in keypoint count map 61 above and to the left of that cell. Keypoint integral image 62 may also be referred to as an integral image of keypoint count map 61.

As shown at block 280, once keypoint processing module 24 has finished generating keypoint integral image 62, keypoint processing module 24 may save keypoint integral image 62. The process of FIG. 4 may then end, as may the process of FIG. 3.

Referring again to FIG. 2, as shown at block 216, region filter module 26 may then use initial region set 64 and keypoint integral image 62 to generate KF region set 66. For instance, region filter module 26 may use a process like the one illustrated in FIG. 5 to generate KF region set 66.

Figure 5:
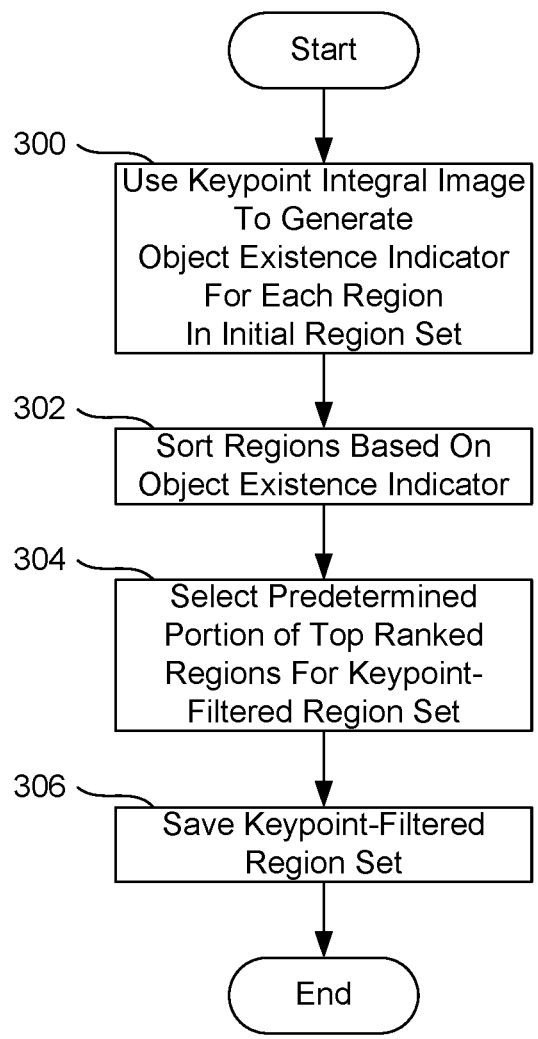
FIG. 5 presents a flowchart of an example embodiment of a process for using a keypoint integral image to generate a keypoint-filtered region set.

FIG. 5 presents a flowchart of an example embodiment of a process for using keypoint integral image 62 to generate KF region set 66. The process may start at block 300 with region filter module 26 using keypoint integral image 62 to generate an object existence indicator for each region in initial region set 64. The object existence indicator for a region is a value which corresponds to the likelihood of that region containing an object. In particular, region filter module 26 may compute the object existence indicator for each region as the total number of keypoints within that region. Furthermore, region filter module 26 may use keypoint integral image 62 to efficiently determine the total number of keypoints in each region. For instance, to compute the object existence indicator for a region, region filter module 26 may use the following formula:

$$OEI:=KII(i_2,j_2)+KII(i_1,j_2)-KII(i_2,j_1)$$

where:
OEI is the object existence indicator,
$(i_1,j_1)$ indicates the upper left corner of the region, and
$(i_2,j_2)$ indicates the lower right corner of the region.

As shown at block 302, region filter module 26 may then sort initial region set 64 according to the object existence indicator for each region. As shown at block 304, region filter module 26 may then select a certain portion of the top ranked regions to serve as KF region set 66. For instance, in one embodiment, region filter module 26 uses the top 30% of the ranked regions as KF region set 66. In other embodiments, region filter modules may use different metrics to determine which top ranked regions will constitute the KF region set. For instance, suitable metrics may include, without limitation, different percentages of top-ranked regions (e.g., 29% or 31%), a predetermined number of top-ranked regions (e.g., 9,000 or 10,000), or a combination of metrics (e.g., (i) the top 30% but no more than 10,000 total or (ii) all of the top 9,000 that are also in the top 30%).

After region filter module 26 has filtered a portion of the top ranked regions into KF region set 66, region filter module 26 may then save KF region set 66, as shown at block 308. Since region filter module 26 uses object existence indicators to filter region proposals, region filter module 26 may also be referred to as an "object-existence-indicator-based region proposal filter."

Referring again to FIG. 2, after region filter module 26 has generated KF region set 66, region filter module 26 may pass KF region set 66 to object proposal subsystem 20, as shown at block 218. Object proposal subsystem 20 may then perform additional filtering operations on KF region set 66 to generate a smaller set of region proposals, as shown at block 220. As indicated above, this smaller set of region proposals may be referred to as "double-filtered region set" 68. As shown at block 222, object proposal subsystem 20 may then pass the double-filtered region set 68 to object classification subsystem 30. Object classification subsystem 30 may then use double-filtered region set 68 to perform object recognition, as shown at block 224. For instance, object classification subsystem 30 may determine which of the regions in double-filtered region set 68 actually contain object instances, and object classification subsystem 30 may perform object classification and object identification on those object instances. ODN 10 may use any suitable approach or combination of approaches to perform tasks like initial-region-set generation, object classification, and object identification. For instance, region proposal module 22 may use approaches like those used by HyperNet. The process of FIG. 2 may then end.

In one embodiment, object proposal subsystem 20 may be implemented as a HyperNet proposal network, and object classification subsystem 30 may be implemented as a HyperNet detection network. A convention proposal network may need to process an initial region set with tens of thousands of region proposals. By contrast, according to the present disclosure, object proposal subsystem 20 receives a much smaller set of region proposals, in the form of KF region set 66. Consequently, object proposal subsystem 20 may generate the region set to be used by object classification subsystem 30 (double-filtered region set 68) much more quickly than if object proposal subsystem 20 needed to process all of the region proposals in initial region set 64.

Thus, according to the present disclosure, a proposal network may analyze a much smaller number of region proposals. For instance, as indicated above, in one embodiment, the proposal network considers a KF region set that contains only 30% of the initial region set. As indicated above, an ODN according to the present disclosure includes a region proposal filter to provide a highly efficient bounding-box filter that is based on the texture of the objects in the image, as reflected in the keypoints for that image. The texture attributes reflected in the keypoints may include corners, edges, etc.

In addition, an ODN according to the present disclosure may have the same or similar accuracy as an ODN using conventional methods. An experiment was performed based on the Pascal Visual Object Classes (VOC) challenge, using more than 9,000 images from the VOC2007 dataset and a DPS utilizing an Intel® Core(™) i7-6700 processor. An ODN according to the present disclosure filtered out 70% of the initial regions, and was only 2.5% less accurate than a conventional ODN using the HyperNet approach. In addition, runtime for the object classification subsystem was reduced by 150 milliseconds (ms) (from 450 ms to 300 ms), offset by only about 5 ms in the object proposal subsystem for generating the keypoint integral image and such, thereby realizing a performance gain of about 33%.

As indicated above, the keypoint processing module is good at determining whether a potential keypoint is an edge, a corner, etc. Consequently, the number of keypoints inside a specific bounding box is very likely to have strong positive correlation with the existence of an object in that box. Furthermore, the present disclosure describes effective and efficient techniques for mapping keypoints to regions and for determining how many keypoints are in a given region. Specifically, the present disclosure describes effective and efficient techniques for generating data structures such as keypoint count maps and keypoint integral images and for using those data structures to rank region proposals.

By contrast, a brute force technique to use keypoints to rank region proposals might have too much complexity to be feasible. For instance, for an image with M keypoints and N bounding boxes, the complexity of a brute force algorithm might be on the order of O(MN). And with tens of thousands of keypoints and tens of thousands of region proposals, such an algorithm may be too compute intensive for practical application. By contrast, the approach described herein to use a keypoint integral image and such may have a linear complexity on the order O(N).

The following pseudocode for the algorithm "GenerateKeypointIntegralImage" is another way to describe some if the ideas presented above.

```
Image GenerateKeypointIntegralImage(Image IM1, int w, int h)
{
1.   Image IM2 = Image.CreateIntegerValueImage(w,h)
                              //create auxiliary integer value Image
                              //IM2 has the same shape as IM1
2.   IM2.SetAllPixelValue(0)   //set the initial value of all pixels of IM2 to be 0
3.   KeypointSet S = ExtractKeyPoint(IM1)
                              //extract keypoint of IM1
4.   for each keypoint K in S
5.       do (i,j) = round($x_k$), round ($y_k$)   //round floating coordinate to the nearest one
6.           IM2.ValueAt(i,j) += 1   //increase keypoint number around (i,j) by 1
7.   Image IM3 = Image.ComputeIntegralImage(IM2)
                              //compute integral image of IM2 to
                              //get keypoint integral image
8.   return IM3
}
```

For instance, according to the above pseudocode, in line 2 the algorithm initiates all of the cells or pixel values of auxiliary image IM2 to be 0. In lines 4 to 6, for each keypoint of IM1, the algorithm rounds its floating coordinate $(x_k,y_k)$ to the nearest integer (i,j) and increases value of IM2(i,j) by 1. In this way, each keypoint is uniquely mapped to one integer slot of IM2 and 1 is added to the counter there, so IM2(i,j) does indeed record the number of keypoints surrounding location (i,j) in the original image IM1. In line.7, the algorithm computes the normal integral image of IM2 to get the keypoint integral image.

Subsequently, the initial region set uses the integer coordinate pair [($i_1,j_1$), ($i_2,j_2$)] to describe a bounding box A whose top-left corner is ($i_1,j_1$), and whose bottom-right corner is ($i_2,j_2$). Consequently, from the properties of integral images, the formula described above for computing an object existence indicator gives the sum of keypoint counter values from the keypoint count map located inside bounding box A. That sum actually indicates the number of keypoints located inside bounding box A in the original image.

Consequently, by using a keypoint integral image, a region filter module can compute the number of keypoints inside any bounding box in O(1) time. Consequently, the region filter module can compute object existence indicators for N bounding boxes in linear time O(N).

In one embodiment, as indicated above, region filter module 26 applies the filter to initial region set 64 after initial region proposals (e.g., bounding boxes) have been generated for initial region set 64 but before the region proposals have been fed into object proposal subsystem 20. As further indicated above, keypoint set 60 is generated based on the raw image 50, and those keypoints are used to generate keypoint integral image 62. Additionally, region filter module 26 computes an object existence indicator for each initial region proposal and then sorts object existence indicators 65 in decreasing order. And region filter module 26 uses that sorted set or list to build KF region set 66, by preserving a certain portion (e.g., 30%) of the top-ranked region proposals and discarding the rest. Region proposal filter 28 then passes KF region set 66 and image 50 to object proposal subsystem 20.

In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Also, this disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. And software that is used during the boot process may be referred to as firmware, as indicated above. Software that is stored in nonvolatile memory may also be referred to as firmware. In addition, terms like "program" and "module" may be used in general to cover a broad range of software constructs, including applications, routines, drivers, subprograms, processes, and other types of software components. Any suitable operating environment and programming language (or combination of operating environments and programming languages) may be used to implement software components described herein.

Alternative embodiments include machine-accessible media encoding instructions or control logic for performing the operations described herein. Such embodiments may also be referred to as program products. Such machine-accessible media may include, without limitation, tangible storage media such as magnetic disks, optical disks, RAM, read-only memory (ROM), etc., as well as processors, controllers, and other components that include RAM, ROM, and/or other storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an application-specific integrated circuit (ASIC), etc.).

Also, it should be understood that any particular software module may include more than one component. For instance, a main bootcode module may include two or more components, and those components may cooperate to complete the operations of the main bootcode module, such as booting to an OS.

Similarly, instructions for multiple components may be stored in one non-transitory machine accessible medium. In at least one other embodiment, two or more non-transitory machine-accessible media may be used for storing the instructions for the relevant components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Similarly, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

The present teachings may be used to advantage in many different kinds of data processing systems. Example data processing systems may include, without limitation, systems on a chip (SOCs), wearable devices, handheld devices, smartphones, telephones, entertainment devices such as audio devices, video devices, audio/video devices (e.g., televisions and set top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a central processing unit (CPU), etc.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system (DPS) with technology for generating a filtered set of region proposals for a digital image processing network. The DPS comprises a processor; at least one machine-accessible medium responsive to the processor; and instructions in the machine-accessible medium which, when executed by the processor, enable the DPS to: (a) generate a keypoint count map for a digital image, wherein the keypoint count map indicates how many keypoints have been detected near different pixels in the digital image; (b) generate a keypoint integral image, wherein the keypoint integral image comprises a summed area table that is based on the keypoint count map; (c) use the keypoint integral image to generate object existence indicators for an initial region set; and (d) use the object existence indicators to extract a keypoint-filtered region set from the initial region set.

Example A2 is a DPS according to Example A1, wherein the instructions further enable the DPS to use the keypoint-filtered region set as region proposal input for an object proposal subsystem.

Example A3 is a DPS according to Example A1, wherein the keypoint count map is based on a set of keypoints for the digital image, wherein each keypoint uses floating-point numbers to specify coordinates for that keypoint. Also, the operation of generating the keypoint count map comprises, for each keypoint in the set of keypoints: (a) converting the coordinates from floating-point numbers to integers; (b) using the integers to map the keypoint to a location in the keypoint count map; and (c) incrementing a counter at that location in the keypoint count map. Example A3 may also include the features of Example A2.

Example A4 is a DPS according to Example A1, wherein the operation of using the keypoint integral image to generate object existence indicators for the initial region set comprises, for each region in the initial region set: (a) determining the number of keypoints that were detected within that region; and (b) using that number of keypoints as the object existence indicator for that region. Example A4 may also include the features of any one or more of Examples A2 through A3.

Example A5 is a DPS according to Example A4, wherein the operation of determining the number of keypoints that were detected within that region comprises: (a) using coordinates for four corners of the region as coordinates for four corresponding cells in the keypoint integral image, wherein the four corners comprise an upper-left corner, an upper-right corner, a lower left corner, and a lower right corner; (b) computing a result by adding values from upper-left and lower-right corners and subtracting values from upper-right and lower-left corners; and (c) using the result as the object existence indicator.

Example A6 is a DPS according to Example A1, wherein the operation of using the object existence indicators to extract a keypoint-filtered region set from the initial region set comprises: (a) using the object existence indicators to rank the regions based on the number of keypoints for each regions; and (b) selecting a certain portion of top-ranked regions to constitute the keypoint-filtered region set. Example A6 may also include the features of any one or more of Examples A2 through A5.

Example A7 is a DPS according to Example A1, wherein the instructions in the machine-accessible medium comprise a region proposal filter for an object detection network (ODN). Also, the region proposal filter, when executed, makes the keypoint-filtered region set available to an object proposal subsystem of the ODN. Example A7 may also include the features of any one or more of Examples A2 through A6.

Example A8 is a DPS according to Example A7, wherein the instructions in the machine-accessible medium further comprise the object proposal subsystem. Also, the object proposal subsystem, when executed: (a) uses the keypoint-filtered region set to generate a double-filtered region set; and (b) makes the double-filtered region set available to an object classification subsystem of the ODN.

Example A9 is a DPS according to Example A8, wherein the instructions in the machine-accessible medium further comprise the object classification subsystem. Also, the object classification subsystem, when executed, uses the double-filtered region set to detect objects within regions identified by the double-filtered region set.

Example A10 is a DPS according to Example A9, wherein the instructions in the machine-accessible medium further comprise the ODN.

Example B1 is an apparatus with technology for generating a filtered set of region proposals for a digital image processing network. The apparatus comprises at least one non-transitory machine-accessible storage medium; and instructions stored at last partially in the at least one machine-accessible medium. The instructions, when executed by a data processing system (DPS), enable the DPS to (a) generate a keypoint count map for a digital image, wherein the keypoint count map indicates how many keypoints have been detected near different pixels in the digital image; (b) generate a keypoint integral image, wherein the keypoint integral image comprises a summed area table that is based on the keypoint count map; (c) use the keypoint integral image to generate object existence indicators for an initial region set; and (d) use the object existence indicators to extract a keypoint-filtered region set from the initial region set.

Example B2 is an apparatus according to Example B1, wherein the instructions further enable the DPS to use the keypoint-filtered region set as region proposal input for an object proposal subsystem.

Example B3 is an apparatus according to Example B1, wherein the keypoint count map is based on a set of keypoints for the digital image, wherein each keypoint uses floating-point numbers to specify coordinates for that keypoint. Also, the operation of generating the keypoint count map comprises, for each keypoint in the set of keypoints: (a) converting the coordinates from floating-point numbers to integers; (b) using the integers to map the keypoint to a location in the keypoint count map; and (c) incrementing a counter at that location in the keypoint count map. Example B3 may also include the features of Example B2.

Example B4 is an apparatus according to Example B1, wherein the operation of using the keypoint integral image to generate object existence indicators for the initial region set comprises, for each region in the initial region set: (a) determining the number of keypoints that were detected within that region; and (b) using that number of keypoints as the object existence indicator for that region. Example B4 may also include the features of any one or more of Examples B2 through B3.

Example B5 is an apparatus according to Example B4, wherein the operation of determining the number of keypoints that were detected within that region comprises: (a) using coordinates for four corners of the region as coordinates for four corresponding cells in the keypoint integral image, wherein the four corners comprise an upper-left corner, an upper-right corner, a lower left corner, and a lower right corner; (b) computing a result by adding values from upper-left and lower-right corners and subtracting values from upper-right and lower-left corners; and (c) using the result as the object existence indicator.

Example B6 is an apparatus according to Example B1, wherein the operation of using the object existence indicators to extract a keypoint-filtered region set from the initial region set comprises: (a) using the object existence indicators to rank the regions based on the number of keypoints for each regions; and (b) selecting a certain portion of top-ranked regions to constitute the keypoint-filtered region set. Example B6 may also include the features of any one or more of Examples B2 through B5.

Example B7 is an apparatus according to Example B1, wherein the instructions in the machine-accessible medium comprise a region proposal filter for an object detection network (ODN). Also, the region proposal filter, when executed, makes the keypoint-filtered region set available to an object proposal subsystem of the ODN. Example B7 may also include the features of any one or more of Examples B2 through B6.

Example B8 is an apparatus according to Example B7, wherein the instructions in the machine-accessible medium further comprise the object proposal subsystem. Also, the object proposal subsystem, when executed: (a) uses the keypoint-filtered region set to generate a double-filtered region set; and (b) makes the double-filtered region set available to an object classification subsystem of the ODN.

Example B9 is an apparatus according to Example B8, wherein the instructions in the machine-accessible medium further comprise the object classification subsystem. Also, the object classification subsystem, when executed, uses the double-filtered region set to detect objects within regions identified by the double-filtered region set.

Example B10 is an apparatus according to Example B9, wherein the instructions in the machine-accessible medium further comprise the ODN.

Example C1 is a method for generating a filtered set of region proposals for a digital image processing network. The method comprises (a) generating a keypoint count map for a digital image, wherein the keypoint count map indicates how many keypoints have been detected near different pixels in the digital image; (b) generating a keypoint integral image, wherein the keypoint integral image comprises a summed area table that is based on the keypoint count map; (c) using the keypoint integral image to generate object existence indicators for an initial region set; and (d) using the object existence indicators to extract a keypoint-filtered region set from the initial region set.

Example C2 is a method according to Example C1, further comprising using the keypoint-filtered region set as region proposal input for an object proposal subsystem.

Example C3 is a method according to Example C1, wherein the keypoint count map is based on a set of keypoints for the digital image, wherein each keypoint uses floating-point numbers to specify coordinates for that keypoint. Also, the operation of generating the keypoint count map comprises, for each keypoint in the set of keypoints: (a) converting the coordinates from floating-point numbers to integers; (b) using the integers to map the keypoint to a location in the keypoint count map; and (c) incrementing a counter at that location in the keypoint count map. Example C3 may also include the features of Example C2.

Example C4 is a method according to Example C1, wherein the operation of using the keypoint integral image to generate object existence indicators for the initial region set comprises, for each region in the initial region set: (a) determining the number of keypoints that were detected within that region; and (b) using that number of keypoints as the object existence indicator for that region. Example C4 may also include the features of any one or more of Examples C2 through C3.

Example C5 is a method according to Example C4, wherein the operation of determining the number of keypoints that were detected within that region comprises: (a) using coordinates for four corners of the region as coordinates for four corresponding cells in the keypoint integral image, wherein the four corners comprise an upper-left corner, an upper-right corner, a lower left corner, and a lower right corner; (b) computing a result by adding values from upper-left and lower-right corners and subtracting values from upper-right and lower-left corners; and (c) using the result as the object existence indicator.

Example C6 is a method according to Example C1, wherein the operation of using the object existence indicators to extract a keypoint-filtered region set from the initial region set comprises: (a) using the object existence indicators to rank the regions based on the number of keypoints for each regions; and (b) selecting a certain portion of top-ranked regions to constitute the keypoint-filtered region set. Example C6 may also include the features of any one or more of Examples C2 through C5.

Example C7 is a method according to Example C1, wherein the operation of using the object existence indicators to extract a keypoint-filtered region set from the initial region set is performed by a region proposal filter for an object detection network (ODN). Also, the region proposal filter also makes the keypoint-filtered region set available to an object proposal subsystem of the ODN. Example C7 may also include the features of any one or more of Examples C2 through C6.

Example C8 is a method according to Example C7, further comprising, at the object proposal subsystem: (a) using the keypoint-filtered region set to generate a double-filtered region set; and (b) making the double-filtered region set available to an object classification subsystem of the ODN.

Example C9 is a method according to Example C8, further comprising, at the object classification subsystem, using the double-filtered region set to detect objects within regions identified by the double-filtered region set.

Example D is at least one machine-accessible medium comprising computer instructions for generating a filtered set of region proposals for a digital image processing network. The computer instructions, in response to being executed in data processing system, enable the data processing system to perform a method according to any of Examples C1 through C9.

Example E is a data processing system (DPS) with technology for generating a filtered set of region proposals for a digital image processing network. The DPS comprises (a) a processing element; (b) at least one machine-accessible medium responsive to the processing element; and (c) computer instructions stored at least partially in the machine-accessible medium, wherein the computer instructions, in response to being executed, enable the DPS to perform a method according to any of Examples C1 through C9.

Example F is a data processing system with technology for generating a filtered set of region proposals for a digital image processing network. The data processing system comprises means for performing the method of any one of Examples C1 through C9.

What is claimed is:

1. A data processing system (DPS) for generating a filtered set of region proposals for a digital image processing network, the DPS comprising:
a processor;
at least one non-transitory computer-readable storage medium storing instructions executable by the processor; and
instructions stored in the computer-readable storage medium which, when executed by the processor, enable the DPS to:
generate a keypoint count map for a digital image, wherein the keypoint count map indicates how many keypoints have been detected near different pixels in the digital image;
generate a keypoint integral image, wherein the keypoint integral image includes a summed area table that is based on the keypoint count map;
generate object existence indicators for an initial region set for the digital image based on the keypoint integral image; and
extract a keypoint-filtered region set from the initial region set based on the object existence indicators.

2. The DPS according to claim 1, wherein the instructions further enable the DPS to use the keypoint-filtered region set as region proposal input for an object proposal subsystem.

3. The DPS according to claim 1, wherein:
the keypoint count map is based on a set of keypoints for the digital image, wherein each keypoint uses floating-point numbers to specify coordinates for that keypoint; and
generating the keypoint count map includes, for each keypoint in the set of keypoints:
converting the coordinates from floating-point numbers to integers;
using the integers to map the keypoint to a location in the keypoint count map; and
incrementing a counter at that location in the keypoint count map.

4. The DPS according to claim 1, wherein generating object existence indicators for the initial region set based on the keypoint integral image includes, for each region in the initial region set:
determining the number of keypoints that were detected within that region; and
using that number of keypoints as the object existence indicator for that region.

5. The DPS according to claim 4, wherein determining the number of keypoints that were detected within that region includes:
using coordinates for four corners of the region as coordinates for four corresponding cells in the keypoint integral image, wherein the four corners include an upper-left corner, an upper-right corner, a lower left corner, and a lower right corner;
computing a result by adding values from upper-left and lower-right corners and subtracting values from upper-right and lower-left corners; and
using the result as the object existence indicator.

6. The DPS according to claim 1, wherein extracting a keypoint-filtered region set from the initial region set based on the object existence indicators includes:
using the object existence indicators to rank the regions based on the number of keypoints for each region; and
selecting a certain portion of top-ranked regions to constitute the keypoint-filtered region set.

7. The DPS according to claim 1, further including:
a region proposal filter for making the keypoint-filtered region set available to an object proposal subsystem of an object detection network (ODN).

8. The DPS according to claim 7, wherein:
the object proposal subsystem is configured to generate a double-filtered region set based
on the keypoint-filtered region set.

9. The DPS according to claim 8, further including:
an object classification subsystem which, when executed, detects objects within regions identified by the double-filtered region set.

10. An apparatus for generating a filtered set of region proposals for a digital image processing network, the apparatus comprising:
at least one non-transitory computer-readable storage medium; and
instructions stored at last partially in the computer-readable storage medium, wherein the instructions, when executed by a data processing system (DPS), enable the DPS to:
generate a keypoint count map for a digital image, wherein the keypoint count map indicates how many keypoints have been detected near different pixels in the digital image;
generate a keypoint integral image, wherein the keypoint integral image includes a summed area table that is based on the keypoint count map;
generate object existence indicators for an initial region set for the digital image based on the keypoint integral image; and
extract a keypoint-filtered region set from the initial region set based on the object existence indicators.

11. The apparatus according to claim 10, wherein the instructions further enable the DPS to use the keypoint-filtered region set as region proposal input for an object proposal subsystem.

12. The apparatus according to claim 10, wherein:
the keypoint count map is based on a set of keypoints for the digital image, wherein each keypoint uses floating-point numbers to specify coordinates for that keypoint; and
generating the keypoint count map includes, for each keypoint in the set of keypoints:
converting the coordinates from floating-point numbers to integers;
using the integers to map the keypoint to a location in the keypoint count map; and
incrementing a counter at that location in the keypoint count map.

13. The apparatus according to claim 10, wherein the operation of generating object existence indicators for the initial region set based on the keypoint integral image includes, for each region in the initial region set:
determining the number of keypoints that were detected within that region; and
using that number of keypoints as the object existence indicator for that region.

14. The apparatus according to claim 13, wherein determining the number of keypoints that were detected within that region includes:
using coordinates for four corners of the region as coordinates for four corresponding cells in the keypoint integral image, wherein the four corners include an upper-left corner, an upper-right corner, a lower left corner, and a lower right corner;

computing a result by adding values from upper-left and lower-right corners and subtracting values from upper-right and lower-left corners; and using the result as the object existence indicator.

15. The apparatus according to claim 10, wherein extracting a keypoint-filtered region set from the initial region set based on the object existence indicators includes:

using the object existence indicators to rank the regions based on the number of keypoints for each region; and selecting a certain portion of top-ranked regions to constitute the keypoint-filtered region set.

16. The apparatus according to claim 10, further including:

a region proposal filter for making the keypoint-filtered region set available to an object proposal subsystem of an object detection network (ODN).

17. The apparatus according to claim 16, wherein:

the object proposal subsystem is configured to generate a double-filtered region set based on the keypoint-filtered region set.

18. The apparatus according to claim 17, further including:

an object classification subsystem which, when executed, detects objects within regions identified by the double-filtered region set.

19. A method for generating a filtered set of region proposals for a digital image processing network, the method comprising:

generating a keypoint count map for a digital image, wherein the keypoint count map indicates how many keypoints have been detected near different pixels in the digital image;

generating a keypoint integral image, wherein the keypoint integral image includes a summed area table that is based on the keypoint count map;

generating object existence indicators for an initial region set for the digital image based on the keypoint integral image; and extracting a keypoint-filtered region set from the initial region set based on the object existence indicators.

20. The method according to claim 19, further including:

using the keypoint-filtered region set as region proposal input for an object proposal subsystem.

21. The method according to claim 19, wherein:

the keypoint count map is based on a set of keypoints for the digital image, wherein each keypoint uses floating-point numbers to specify coordinates for that keypoint; and generating the keypoint count map includes, for each keypoint in the set of keypoints:

converting the coordinates from floating-point numbers to integers;

using the integers to map the keypoint to a location in the keypoint count map; and incrementing a counter at that location in the keypoint count map.

22. The method according to claim 19, wherein generating object existence indicators for the initial region set based on the keypoint integral image includes, for each region in the initial region set:

determining the number of keypoints that were detected within that region; and using that number of keypoints as the object existence indicator for that region.

23. The method according to claim 22, wherein determining the number of keypoints that were detected within that region includes:

using coordinates for four corners of the region as coordinates for four corresponding cells in the keypoint integral image, wherein the four corners include an upper-left corner, an upper-right corner, a lower left corner, and a lower right corner;

computing a result by adding values from upper-left and lower-right corners and subtracting values from upper-right and lower-left corners; and using the result as the object existence indicator.

24. The method according to claim 19, wherein extracting a keypoint-filtered region set from the initial region set includes:

using the object existence indicators to rank the regions based on the number of keypoints for each region; and selecting a certain portion of top-ranked regions to constitute the keypoint-filtered region set.

25. The method according to claim 19, wherein:

extracting a keypoint-filtered region set from the initial region set is performed by a region proposal filter for an object detection network (ODN); and the region proposal filter also makes the keypoint-filtered region set available to an object proposal subsystem of the ODN.

* * * * *